United States Patent
Wulff et al.

(10) Patent No.: US 11,958,992 B2
(45) Date of Patent: Apr. 16, 2024

(54) PLASTICIZER MIGRATION-RESISTANT, UV-CURABLE HOTMELT ADHESIVE FOR GRAPHICS FILMS AND LABELS MADE OF PLASTICIZED PVC

(71) Applicant: BASF SE, Ludwigshafen am Rhein (DE)

(72) Inventors: Dirk Wulff, Ludwigshafen (DE); Ulrike Licht, Ludwigshafen (DE); Thomas Christ, Ludwigshafen (DE); Matthias Gerst, Ludwigshafen (DE)

(73) Assignee: BASF SE (DE)

( * ) Notice: Subject to any disclaimer, the term of this patent is extended or adjusted under 35 U.S.C. 154(b) by 289 days.

(21) Appl. No.: 16/652,445

(22) PCT Filed: Sep. 28, 2018

(86) PCT No.: PCT/EP2018/076458
§ 371 (c)(1),
(2) Date: Mar. 31, 2020

(87) PCT Pub. No.: WO2019/072594
PCT Pub. Date: Apr. 18, 2019

(65) Prior Publication Data
US 2020/0239747 A1    Jul. 30, 2020

(30) Foreign Application Priority Data

Oct. 11, 2017   (EP) .................................. 17195828

(51) Int. Cl.
| | |
|---|---|
| *C09J 7/35* | (2018.01) |
| *C08F 220/18* | (2006.01) |
| *C09J 133/08* | (2006.01) |
| *C09J 133/10* | (2006.01) |
| *C08L 67/02* | (2006.01) |

(52) U.S. Cl.
CPC ....... *C09J 133/08* (2013.01); *C08F 220/1808* (2020.02); *C09J 7/35* (2018.01); *C09J 133/10* (2013.01); *C08L 67/02* (2013.01); *C09J 2203/334* (2013.01); *C09J 2301/416* (2020.08); *C09J 2427/006* (2013.01); *Y10T 428/2809* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 5,800,919 A | 9/1998 | Peacock et al. | |
| 6,054,213 A | 4/2000 | Peacock et al. | |
| 6,586,491 B2 * | 7/2003 | Husemann | C08F 220/1808 |
| | | | 525/218 |
| 2010/0316861 A1 * | 12/2010 | Kubler | C08J 5/18 |
| | | | 428/220 |
| 2016/0333233 A1 * | 11/2016 | Melnikova | C08F 220/1808 |
| 2016/0369133 A1 | 12/2016 | Mundt | |

FOREIGN PATENT DOCUMENTS

| | | | | |
|---|---|---|---|---|
| CA | 2005283 A1 * | 6/1990 | | G03F 7/027 |
| DE | 100 10 767 A1 | 9/2001 | | |
| EP | 0 377 191 A2 | 7/1990 | | |
| EP | 1 213 306 A2 | 6/2002 | | |
| WO | WO 97/31076 A1 | 8/1997 | | |
| WO | WO 97/31077 A1 | 8/1997 | | |
| WO | WO 02/086002 A2 | 10/2002 | | |
| WO | WO 2007/079080 A1 | 7/2007 | | |
| WO | WO 2013/117428 A1 | 8/2013 | | |
| WO | WO-2015131938 A1 * | 9/2015 | | C09J 7/21 |

OTHER PUBLICATIONS

Technical Information, Palamoll 652, BASF, Jul. 2019 (Year: 2019).*
Fink Ralph et al., "Solutions of UV-curable polyacrylates", machine translation of EP 1213306 A1, Jun. 12, 2002 (Year: 2002).*
Schumacher, Karl-Heinz et al., "Radiation Curable Hot-Melt Adhesives", machine translation of WO2006058694 A1, Jun. 8, 2006 (Year : 2006).*
Ralf, Fink et al., "Solutions of UV-crosslinkable polyacrylates", English translation of EP 1213306A2, Dec. 6, 2002 (Year: 2002).*
Karl-Heinz Schumacher et al., "Radiation-Hardenble Hot-Melt Adhesives", English translation of WO2006058694 A1, Jun. 8, 2006 (Year: 2006).*
International Search Report dated Nov. 30, 2018 in PCT/EP2018/076458 filed on Sep. 28, 2018, 2 pages.

* cited by examiner

*Primary Examiner* — Anish P Desai
(74) *Attorney, Agent, or Firm* — Faegre Drinker Biddle & Reath LLP

(57) ABSTRACT

Plasticizer migration-resistant, UV-curable hotmelt adhesive for graphics films and labels made of plasticized PVC
Described here is a UV-curable hotmelt adhesive largely resistant to plasticizer migration and comprising a UV-crosslinkable poly(meth)acrylate formed from methyl acrylate, C4-18 alkyl (meth)acrylate, monomer with acid groups, copolymerized photoinitiator and optionally further monomers. The hotmelt adhesive further comprises an aliphatic polyester polymer. The use of the hotmelt adhesive on graphics films and self-adhesive labels made of plasticized PVC is also described.

8 Claims, No Drawings

PLASTICIZER MIGRATION-RESISTANT, UV-CURABLE HOTMELT ADHESIVE FOR GRAPHICS FILMS AND LABELS MADE OF PLASTICIZED PVC

Plasticizer migration-resistant, UV-curable hotmelt adhesive for graphics films and labels made of plasticized PVC.

The invention relates to a plasticizer migration-resistant UV-curable hotmelt adhesive comprising a particular UV-curable poly(meth)acrylate and a particular aliphatic polyester polymer. The use of the hotmelt adhesive on graphics films made of plasticized PVC and on self-adhesive labels made of plasticized PVC is also described.

Conventional UV-curable hotmelt adhesives based on UV-crosslinkable poly(meth)acrylates are often not sufficiently resistant to the migration of plasticizers, for example if they are used as an adhesive for plasticizer-containing substrates. Plasticizers can migrate from the substrate into the adhesive layer, thus markedly reducing adhesive strength. There is therefore a need for UV-curable hotmelt adhesives that are resistant to plasticizer migration.

WO 02/086002 describes plasticizer-resistant adhesive systems based on copolymers of aromatic (meth)acrylate monomers, nitrogen-containing vinyl monomers and alkyl (meth)acrylates. UV-crosslinkable hotmelt adhesives based on (meth)acrylate polymers having a comparatively high content of methyl methacrylate (>20% by weight) are known for example from WO 93/31077, WO 97/31076, WO 2007/079080 and U.S. Pat. No. 5800919.

The present invention accordingly has for its object to provide hotmelt adhesives based on UV-crosslinkable poly(meth)acrylates which show the lowest possible reduction in adhesive strength over time when employed on plasticizer-containing substrates, for example graphics films and self-adhesive labels made of plasticized PVC.

The object is achieved by a UV-curable hotmelt adhesive comprising
(a) at least one UV-crosslinkable poly(meth)acrylate formed from
  (i) at least 20% by weight of methyl acrylate,
  (ii) at least one alkyl (meth)acrylate having 4 to 18 carbon atoms in the alkyl group,
  (iii) at least one ethylenically unsaturated monomer comprising at least one acid group,
  (iv) at least one ethylenically unsaturated copolymerizable photoinitiator monomer and
  (v) optionally at least one further monomer distinct from the monomers (i) to (iv) and
(b) at least one aliphatic polyester polymer which at 20° C. has a dynamic viscosity of 500 to 20000 mPas.

The text below occasionally uses the designation "(meth) acrylic" or "(meth)acrylate" or similar as an abbreviating notation for "acrylic or methacrylic" or "acrylate or methacrylate". In the designation Cx-alkyl (meth)acrylate and analogous designations, x denotes the number of carbons (carbon atoms) in the alkyl group.

A poly(meth)acrylate is a polymer which is predominantly, i.e. to an extent of more than 50% by weight, made from (meth)acrylic acid and acid derivatives thereof, in particular the salts, esters or amides thereof.

Reported quantities for monomers of a polymer are based, unless otherwise explicitly stated, on 100 parts by weight of the sum of all monomers.

A pressure-sensitive adhesive is a viscoelastic adhesive which sets to form a film that at room temperature (20° C.) remains permanently tacky and adhesive in the dry state. Adhesion to substrates is effected immediately by gentle pressure.

The term UV-curable describes a substance or a composition which cures upon irradiation with UV light. The term UV-crosslinkable is to be understood as meaning that the hotmelt adhesive comprises at least one compound having at least one radiation-sensitive group and a crosslinking reaction is induced upon irradiation. Irradiation for crosslinking is carried out using UV light, in particular UV-C radiation.

Hotmelt adhesives, also known as hot glue, are solvent-free products, i.e. they are not dissolved or dispersed in water or organic solvents. They are products that are more or less solid at room temperature and that in the hot state are sufficiently fluid to be applicable to an adherend surface due to the accompanying viscosity reduction and upon cooling produce the adhesive bond, with UV-crosslinkable hotmelt adhesives additionally being irradiated here.

In radiation-crosslinkable pressure-sensitive adhesives the cohesion, i.e. the inner strength of the adhesive layer, is achieved after coating the adhesive onto a carrier by subsequent photochemically induced crosslinking.

The radiation-crosslinkable poly(meth)acrylate is constructed to an extent of at least 20% by weight, i.e. 20% by weight or more, preferably 25% by weight or more, 30% by weight or more or 35% by weight or more and preferably to an extent of up to 60% by weight, for example from 20% to 60% by weight or from 25% to 55% by weight or from 30% to 50% by weight, from methyl acrylate (i).

The radiation-crosslinkable poly(meth)acrylate is constructed from at least one alkyl (meth)acrylate having 4 to 18 carbon atoms in the alkyl group (ii), preferably to an extent of at least 30% or at least 35% by weight, for example from 35% to 60% by weight. Preference is given to C4 to C10 alkyl (meth)acrylates, in particular C4 to C8 alkyl (meth) acrylates, for example n-butyl (meth)acrylate, isobutyl (meth)acrylate, 2-methylbutyl (meth)acrylate, n-octyl (meth)acrylate, isooctyl (meth)acrylate, isononyl (meth) acrylate, isodecyl (meth)acrylate, n-hexyl acrylate, 2-propylhexyl acrylate and 2-ethylhexyl acrylate and mixtures thereof. n-Butyl acrylate and 2-ethyl hexyl acrylate are particularly preferred. The radiation-crosslinkable poly (meth)acrylate is preferably formed to an extent of at least 30% by weight from C4- to C10-alkyl (meth)acrylates, preferably selected from n-butyl acrylate and 2-ethylhexyl acrylate.

The radiation-crosslinkable poly(meth)acrylate is constructed from at least one ethylenically unsaturated monomer comprising at least one acid group (acid monomer (iii)).

The poly(meth)acrylate polymer is preferably formed to an extent of 0.1% to 30% by weight, particularly preferably to an extent of 0.5% to 25% by weight or to an extent of 1% to 15% by weight or to an extent of 1% to 10% by weight, of the monomers having acid groups. Contemplated acid monomers (iii) include in particular monomers having carboxylic acid, sulfonic acid or phosphonic acid groups. Carboxylic acid groups are preferred. These include, for example, acrylic acid, methacrylic acid, itaconic acid, maleic acid or fumaric acid. Preferred monomers having carboxylic acid groups include acrylic acid, methacrylic acid or mixtures thereof.

The poly(meth)acrylate is radiation-crosslinkable through irradiation with UV light. The radiation-crosslinkable poly(meth)acrylate is constructed from at least one ethylenically unsaturated copolymerizable photoinitiator monomer (iv). A photoinitiator monomer is an ethylenically unsaturated copolymerizable compound having at least one photoinitiator group. The hotmelt adhesive preferably contains 0.0001 to 0.5 mol, particularly preferably 0.0002 to 0.1 mol, very particularly preferably 0.003 to 0.01 mol of the molecular group active as a photoinitiator and bound to the polymer per 100 g of poly(meth)acrylate. The poly(meth)acrylate is preferably formed to an extent of not less than 0.1% by weight, preferably not less than 0.2% by weight, for example from 0.1% to 10% by weight, from 0.2% to 5% by weight or from 0.5% to 1.5% by weight, from at least one ethylenically unsaturated, copolymerizable compound having a photoinitiator group.

The photoinitiator may be selected for example from so-called a-splitters in which a chemical bond is split to form 2 radicals which initiate the further crosslinking or polymerization reactions. These include for example acylphosphine oxides, hydroxyalkylphenones, benzoin derivatives, benzil derivatives, dialkyloxyacetophenones. They may especially be so-called H-abstractors which detach a hydrogen atom from the polymer chain, for example photoinitiators having a carbonyl group. This carbonyl group inserts itself into a C—H bond to form a C—C—O—H moiety. Examples include in particular acetophenone, benzophenone and derivatives thereof. Both classes of photoinitiators may be used alone or else in admixture. The photoinitiator monomer is incorporated into the polymer chain, for example by free radical copolymerization. The photoinitiator monomer preferably comprises an acryloyl or methacryloyl group to this end.

By irradiation with high-energy light, in particular UV light, the photoinitiator or the photoinitiator group brings about crosslinking of the polymer, preferably by means of a chemical grafting reaction of the photoinitiator group with a spatially adjacent polymer or oligomer chain. The crosslinking may in particular be effected by insertion of a carbonyl group of the photoinitiator into an adjacent C—H bond to form a —C—C—O—H moiety. The wavelength range in which the photoinitiator group may be activated, i.e. which comprises the primary absorption band of the photoinitiator group, is preferably 200 to 450 nm, particularly preferably 250 to 350 nm, very particularly preferably 250 to 280 nm.

The UV-crosslinkable poly(meth)acrylate may be produced by free radical polymerization of ethylenically unsaturated monomers with co-polymerization of at least one radiation-sensitive, free-radically polymerizable organic compound. Radiation-sensitive, free-radically polymerizable organic compounds are hereinbelow referred to as polymerizable photoinitiator for short. The polymerizable photoinitiator may be incorporated into the polymer chain of copolymers by free radical copolymerization. Polymerizable photoinitiators preferably have the following theoretical structure:

A-X-B wherein A is a monovalent organic radical that preferably comprises a phenone group as the radiation-sensitive group, X is an ester group selected from —O—C(=O)—, —(C=O)—O— and —O—(C=O)—O— and B is a monovalent organic radical comprising an ethylenically unsaturated free-radically polymerizable group. Preferred radicals A are radicals comprising at least one structural element derived from phenones, in particular from acetophenones or benzophenones. Preferred radicals B comprise at least one, preferably precisely one, acrylic or methacrylic group.

The ethylenically unsaturated group may be directly bonded to the group X. The radiation-sensitive group may likewise be directly bonded to the group X. However, there may also be a spacer group between the ethylenically unsaturated group and the group X and between the radiation-sensitive group and group X respectively. The spacer group may have a molecular weight of up to 500, in particular up to 300 or 200, g/mol for example.

Suitable copolymerizable photoinitiators are acetophenone or benzophenone derivatives which comprise at least one, preferably one, ethylenically unsaturated group as described for example in EP 377191 A or EP 1213306 A. The ethylenically unsaturated group is preferably an acryloyl or methacryloyl group. The ethylenically unsaturated group may be directly bonded to the phenyl ring of the acetophenone or benzophenone derivative. There is generally a spacer group between the phenyl ring and the ethylenically unsaturated group. The spacer group may comprise for example up to 100 carbon atoms.

A preferred group X is the carbonate group —O—(C=O)—O—. Preferred polymerizable photoinitiators are compounds of formula F-1:

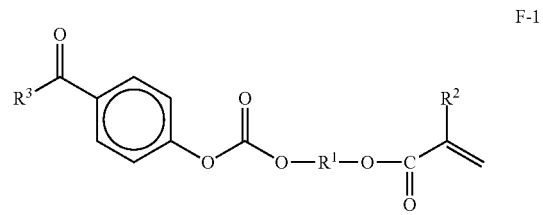

F-1 wherein R1 represents an organic radical having up to 30 carbon atoms, R2 represents an H atom or a methyl group and R3 represents a substituted or unsubstituted phenyl group or a C1-C4-alkyl group. R1 particularly preferably represents an alkylene group, in particular a C2-C8-alkylene group. R3 particularly preferably represents a methyl group or a phenyl group, very particularly preferably a phenyl group.

Further acetophenone and benzophenone derivatives suitable as copolymerizable photoinitiators are, for example, those of formula F-2

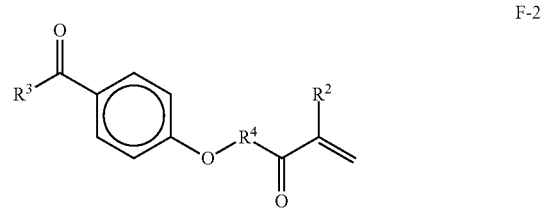

F-2 wherein R2 and R3 are as defined above and R4 may represent a single bond or (—CH2-CH2—O)n, wherein n represents an integer from 1 to 12.

The UV-crosslinkable poly(meth)acrylate may optionally be constructed from at least one further monomer (v) distinct from the monomers (i) to (iv). The usage amount of the further monomers (v) is preferably 0% to 25% by weight, for example from 0.1% to 20% by weight, from 0.5% to 15% by weight or from 1% to 10% by weight. The further monomers are ethylenically unsaturated copolymerizable compounds, for example methyl methacrylate, ethyl acrylate, ethyl methacrylate, propyl (meth)acrylate, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and 1 or 2 double bonds or mixtures of these monomers. Vinyl esters of carboxylic acids having 1 to 20 carbon atoms are, for example, vinyl laurate, vinyl stearate, vinyl propionate, Versatic acid vinyl esters, and vinyl acetate. Suitable vinylaromatic compounds include for example vinyltoluene, α- and p-methylstyrene, alpha-butyl-styrene, 4-n-butylstyrene, 4-n-decylstyrene and preferably styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Examples of vinyl ethers include vinyl methyl ether or vinyl isobutyl ether. Preference is given to vinyl ethers of alcohols comprising 1 to 4 carbon atoms. Hydrocarbons having 2 to 8 carbon atoms and two olefinic double bonds include butadiene, isoprene and chloroprene.

The further monomers (v) may also be monomers having polar groups (polar monomers). These preferably have a water solubility at 21° C. of more than 5 g/liter or more than 10 g/liter. Polar monomers are for example (meth)acrylamide and hydroxyl-comprising monomers, in particular C1-C10-hydroxyalkyl (meth)acrylates. Preferred monomers having hydroxyl groups are C1-C10-hydroxyalkyl (meth) acrylates, in particular hydroxyethyl (meth)acrylate and hydroxypropyl (meth)acrylate.

However, the further monomers (v) preferably comprise no N-containing monomers or essentially no N-containing monomers. The further monomers (v) preferably comprise no aromatic monomers or essentially no aromatic monomers. The term "essentially no" is to be understood as meaning usage amounts of less than 1% by weight, preferably not more than 0.5% by weight.

A radiation-crosslinkable poly(meth)acrylate preferred according to the invention is formed from
(i) 25% to 60% by weight of methyl acrylate,
(ii) 35 to 60% by weight of at least one alkyl (meth) acrylate having 4 to 18 carbon atoms in the alkyl group and selected from the group consisting of n-butyl acrylate, n-hexyl acrylate, 2-ethylhexyl acrylate, propylheptyl acrylate and mixtures thereof,
(iii) 1% to 10% by weight of acrylic acid, methacrylic acid or a mixture thereof,
(iv) 0.2% to 5% by weight of at least one ethylenically unsaturated copolymerizable photoinitiator monomer and
(v) 0% to 25% of at least one further monomer distinct from the monomers (i) bis (iv).

Before crosslinking the UV-crosslinkable poly(meth)acrylate has a glass transition temperature of preferably not more than 10° C., for example from −60° C. to +10° C., in particular in the range from −60° C. to 0° C., or from −55° C. to −10° C., particularly preferably from −55° C. to −15° C. The glass transition temperature is determined by differential scanning calorimetry (ASTM D 3418-08, midpoint temperature). The glass transition temperature of the polymer is the glass transition temperature obtained when evaluating the second heating curve (heating rate 20° C./min).

The so-called Fox equation allows the person skilled in the art to identify copolymers in the appropriate Tg range in advance and to produce them in a targeted manner by suitable variation of the type and amount of the monomers. According to Fox (T. G. Fox, Bull. Am. Phys. Soc. 1956 [Ser. II] 1, page 123 and according to Ullmann's Encyclopedia of Industrial Chemistry, vol. 19, page 18, 4th edition, Verlag Chemie, Weinheim, 1980) the glass transition temperature of at most weakly crosslinked copolymers is given to a good approximation by:

$$1/T_g = x^1/T_g^1 + x^2/T_g^2 + \ldots x^n/T_g^n,$$

wherein $x^1, x^2, \ldots x^n$ are the mass fractions of the monomers $1, 2, \ldots n$ and $T_g^1, T_g^2, \ldots T_g^n$ are the glass transition temperatures in degrees kelvin of the polymers constructed from only one of the monomers $1, 2, \ldots n$ at a time. The $T_g$ values for the homopolymers of the majority of monomers are known and are listed for example in Ullmann's Encyclopedia of Industrial Chemistry, vol. A21, page 169, 5th edition V C H Weinheim, 1992; further sources for glass transition temperatures of homopolymers are, for example, J. Brandrup, E. H. Immergut, Polymer Handbook, $1^{st}$ Ed., J. Wiley, New York 1966, $2^{nd}$ Ed., J. Wiley, New York 1975, and $3^{rd}$ Ed., J. Wiley, New York 1989.

The UV-crosslinkable poly(meth)acrylate of the hotmelt adhesive before crosslinking preferably has a K value of not less than 20, for example of 30 to 80, particularly preferably of 40 to 60, measured in tetrahydrofuran (1% solution, 21° C.). The Fikentscher K value is a measure of the molecular weight and the viscosity of the polymer. The viscosity is measured using a capillary viscometer. Operating procedures may be found in DIN EN ISO 1628-1:2012-10.

The poly(meth)acrylates are producible by copolymerizing the monomeric components using the customary polymerization initiators and optionally chain transfer agents, wherein polymerization is carried out at the customary temperatures in bulk, in emulsion, for example in water or liquid hydrocarbons, or in solution. The poly(meth)acrylates are preferably produced by polymerization of the monomers in organic solvents, in particular in organic solvents having a boiling range of 50° C. to 150° C., preferably of 60° C. to 120° C., using the customary amounts of polymerization initiators which are generally 0.01% to 10% by weight, in particular 0.1% to 4% by weight, based on the total weight of the monomers. The polymers may be produced at temperatures of 20° C. to 150° C., preferably at temperatures in the range from 70° C. to 120° C., and pressures of 0.1 to 100 bar (absolute), preferably at 0.3 to 10 bar, in the presence of 0.01% to 10% by weight of peroxides or azo starters as polymerization initiators based on the monomers and in the presence of 0% to 200% by weight of inert solvents, preferably 5% to 25% by weight based on the monomers, i.e. by solution or bulk polymerization. The reaction is preferably carried out under increasing vacuum, for example by reducing the pressure from standard pressure (1 bar) to 500 mbar (absolute). Solvents are, for example, hydrocarbons, alcohols such as methanol, ethanol, propanol, butanol, isobutanol, ketones such as acetone, methyl ethyl ketone, methyl isobutyl ketone, ethyl acetate, nitriles such as acetonitrile and benzonitrile or mixtures of the recited solvents. In a preferred embodiment the solvents for the polymerization are one or more ketones having a boiling point of below 150° C. at standard pressure (1 bar).

Suitable polymerization initiators include for example azo compounds, ketone peroxides and alkyl peroxides, for example acyl peroxides such as benzoyl peroxide, dilauroyl peroxide, didecanoyl peroxide, isononanoyl peroxide, alkyl esters such as tert-butyl perpivalate, tert-butyl per-2-ethylhexanoate, tert-butyl permaleate, tert-butyl perisononanoate, tert-butyl perbenzoate, tert-amyl per-2-ethylhexanoate, dialkyl peroxides such as dicumyl peroxide, tert-butyl cumyl peroxide, di-tert-butyl peroxide and peroxodicarbonates. Also employable as initiators are azo starters such as for example 2,2'-azobisisobutyronitrile, 2,2'-azobis(methylisobutyrate) or 2,2'-azobis(2,4-dimethylvaleronitrile).

To perform the polymerization the reaction mixture may also be admixed with compounds which reduce the degree of polymerization, so-called chain transfer agents, for example in amounts of 0.1 to 0.8 parts by weight based on 100 parts by weight of the monomers to be polymerized. Suitable compounds include for example those having a thiol group, for example mercaptans such as mercaptoethanol, tert-butyl mercaptan, mercaptosuccinic acid, ethylhexyl thioglycolate, 3-mercaptopropyltrimethoxysilane or dodecyl mercaptan.

After the solution polymerization the solvents may be removed optionally under reduced pressure and at elevated temperatures, for example in the range from 100° C. to 150° C. The polymers may then be employed in a solvent-free state (solvent content preferably less than 2% by weight based on the total composition), i.e. as melts.

The hotmelt adhesive according to the invention comprises at least one aliphatic polyester polymer. The usage amount is preferably 1% to 20% by weight, particularly preferably 2% to 15% by weight.

The polyester polymer is a compound liquid at room temperature (20° C.) having a dynamic viscosity of 500 mPas to 20 000 mPas, preferably of 1000 mPas to 10 000 mPas, at 20° C. (measured according to DIN 51562:1999-01). The acid numbers of the polyester polymers are preferably not more than 2 mg KOH/g (measured according to DIN EN ISO 2114:2002-06).

An aliphatic polyester polymer is a polyester formed from at least two units of polycarboxylic acid (preferably aliphatic dicarboxylic acid) and at least two units of aliphatic polyol (preferably aliphatic diol).

It is preferable to employ polyesters obtained by reacting dibasic alcohols with dibasic carboxylic acids, optionally with co-use of monofunctional alcohols. Instead of using free polycarboxylic acids, the polyesters may also be produced using the corresponding polycarboxylic anhydrides or the corresponding polycarboxylic esters of lower alcohols or mixtures thereof. Dicarboxylic acid components include for example glutaric anhydride, maleic acid, maleic anhydride, fumaric acid, dimeric fatty acids. Preference is given to dicarboxylic acids of general formula HOOC—$(CH_2)_y$—COOH, wherein y is a number from 1 to 20, preferably an even number from 2 to 20, for example succinic acid, adipic acid, sebacic acid and dodecanedicarboxylic acid. Suitable dihydric alcohols are, for example, ethylene glycol, propane-1,2-diol, propane-1,3-diol, butane-1,3-diol, butene-1,4-diol, butyne-1,4-diol, pentane-1,5-diol, neopentyl glycol, 2-methylpropane-1,3-diol, methylpentanediols, furthermore diethylene glycol, triethylene glycol, tetraethylene glycol, polyethylene glycol, dipropylene glycol, polypropylene glycol, dibutylene glycol and polybutylene glycols. Preference is given to alcohols of general formula HO—$(CH_2)_x$—OH, wherein x is a number from 1 to 20, from 2 to 10, or preferably from 4 to 8, wherein x is preferably an even number in each case. Examples thereof are ethylene glycol, butane-1,4-diol, hexane-1,6-diol, octane-1,8-diol and dodecane-1,12-diol. Neopentyl glycol is also preferred. Employable monofunctional alcohols include linear and branched alcohols having 1 to 15 carbon atoms, preferably having 2 to 8 carbon atoms, such as ethanol, methanol, 2-ethylhexanol, 2-propylheptanol, butanol, hexanol, octanol, isononanol.

The aliphatic polyester polymer is preferably constructed from at least one aliphatic dicarboxylic acid having 3 to 10, preferably 4 to 8, carbon atoms and at least one alkanediol having 2 to 10, preferably 4 to 8, carbon atoms and an alkanemonool having 2 to 10, preferably 4 to 8, carbon atoms. An aliphatic polyester polymer composed of adipic acid and at least one alkanediol having 4 to 8 carbon atoms is particularly preferred.

A preferred hotmelt adhesive is one wherein the radiation-crosslinkable poly(meth)acrylate (a) is formed from
(i) 25% to 60% by weight of methyl acrylate,
(ii) 35% to 60% by weight of at least one alkyl (meth) acrylate having 4 to 18 carbon atoms in the alkyl group and selected from the group consisting of n-butyl acrylate, n-hexyl acrylate, 2-ethylhexyl acrylate, propylheptyl acrylate and mixtures thereof,
(iii) 1% to 10% by weight of acrylic acid, methacrylic acid or a mixture thereof,
(iv) 0.5% to 4% by weight of at least one ethylenically unsaturated copolymerizable photoinitiator monomer and
(v) 0% to 25% of at least one further monomer distinct from the monomers (i) bis (iv), and the aliphatic polyester polymer (b) is used in an amount of 2% to 20% by weight and is constructed from at least one aliphatic dicarboxylic acid having 4 to 8 carbon atoms and at least one alkanediol having 4 to 8 carbon atoms.

The hotmelt adhesive according to the invention preferably has a viscosity at zero shear of less than 100 Pas at 130° C. It is employed in solvent-free, meltable form. Solvent present as a consequence of manufacture may be removed beforehand by suitable processes, preferably to a residual content of less than 0.5% by weight based on the solids content.

Contemplated hotmelt adhesives include in particular those which comprise water or organic solvents, for example from solution polymerization, only in small amounts, if at all, and are applied from the melt. The hotmelt adhesive preferably comprises less than 5 parts by weight, in particular less than 2 or less than 1 parts by weight, of water and/or organic solvents based on 100 parts by weight of the total weight of the adhesive polymer. It is particularly preferable when the hotmelt adhesive is substantially free of water and organic solvents.

The hotmelt adhesive may comprise the customary added substances such as for example resins, plasticizers, antioxidants, crosslinkers, fillers, dyes, flow control agents, tackifiers (tackifying resinss) etc.

The pressure-sensitive adhesive composition preferably comprises at least one tackifier (tackifying resins). The weight fraction of the tackifiers is preferably 2 to 30 parts by weight, particularly preferably 2 to 25 parts by weight or 5 to 50 parts by weight based on 100 parts by weight of adhesive polymer (solid/solid). A tackifier is a polymeric or oligomeric additive for adhesive polymers or generally for elastomers which increases their autoadhesion (tack, inherent tack, self-adhesion) so that after short, light contact pressure they adhere to surfaces firmly. Tackifiers include for example natural resins, such as colophony resins and the derivatives thereof formed by disproportionation or isomerization, polymerization, dimerization or hydrogenation or terpene resins. These may be in their salt form (with for example monovalent or polyvalent counterions (cations)) or preferably in their esterified form. Alcohols used for esterification may be monohydric or polyhydric. Examples include methanol, ethanediol, diethylene glycol, triethylene glycol, 1,2,3-propanethiol, pentaerythritol. Also employable are hydrocarbon resins, for example coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, alpha-methylstyrene, vinyltoluene. Tackifiers are known for example from Adhesive Age, July 1987, pages 19-23 or Polym. Mater. Sci. Eng. 61 (1989), pages 588-592.

Polyacrylates having a low molar weight are increasingly also being used as tackifiers. These polyacrylates preferably have a weight-average molecular weight $M_w$ less than 50 000, in particular less than 30 000. The polyacrylates preferably consist to an extent of at least 60% by weight, in particular at least 80% by weight, of $C_1$-$C_8$ alkyl (meth) acrylates. Suitable tackifiers include for example the low molecular weight polymers and oligomers described in WO 2013/117428 having a weight-average molecular weight of less than 50000 and a glass transition temperature of not less than −40° C. to not more than 0° C., preferably of not less than −35° C. to not more than 0° C., producible by emulsion polymerization in the presence of at least one molecular weight regulator and producible from a monomer mixture comprising at least 40% by weight of at least one C1- to C20-alkyl (meth)acrylate. Preferred tackifiers include natural or chemically modified colophony resins. Colophony resins consist predominantly of abietic acid or abietic acid derivatives.

To produce the adhesive coatings the pressure-sensitive hotmelt adhesives are applied as a melt to a substrate, for example at temperatures of 50° C. to 160° C., preferably 80° C. to 150° C. or more than 100° C. The application rate of the pressure-sensitive hotmelt adhesive is preferably from 5 to 50 g/m², particularly preferably from 10 to 30 g/m².

Preferred substrates include polymer films, in particular plasticizer-containing polymer films. Contemplated carriers include for example polyvinyl chloride films. The film thickness is preferably 30 μm to 150 μm. However, it is also possible to employ in certain applications (for example sun protection films for car windows, PVC labels) thinner films having a thickness of from 20 μm and in the field of surface protection of automobile bodies very much larger thicknesses of up to 350 μm. Polyvinyl chloride films are producible either by calendering (from the melt) or casting (from solution). In addition to UV absorbers, stabilizers, process auxiliaries and optionally pigments and fillers the films necessarily comprise plasticizers since pure PVC is a brittle polymer. Typical plasticizer contents are 25% to 50% but in particular applications plasticizer contents from 10% (rigid films) and up to 70% (highly flexible films) are also possible.

Plasticizers are particular liquid or solid inert organic substances having a low vapor pressure which are predominantly of an ester-like nature and without chemical reaction, preferably through their dissolution and swelling power, are able to undergo physical interaction with highly polymerized substances to form a homogeneous system therewith. Plasticizers impart the articles or coatings produced therewith with certain desired physical properties, for example reduced glass transition temperature, increased formability, increased elastic properties or reduced hardness. They are a type of plastic additive. They are introduced into a material in order to improve its processability, flexibility and extensibility such as for example in plasticized PVC. Preferred plasticizers are, for example, phthalate esters (for example dioctyl phthalate, diisononyl phthalate, diisodecyl phthalate; dibutyl phthalate, diisobutyl phthalate, dicyclohexyl phthalate; dimethyl phthalate, diethyl phthalate, mixed esters of benzyl butyl, butyl octyl, butyl decyl and dipentyl phthalate, bis(2-methoxyethyl) phthalate, dicapryl phthalate and the like); esters of trimellitic acid and (predominantly) linear $C_6$- to $C_{11}$-alcohols (for example tris(2-ethylhexyl) trimellitate); acyclic and aliphatic dicarboxylate esters (for example dioctyl adipate, diisodecyl adipate, dibutyl sebacate, dioctyl sebacate, decanedioate esters or azelates); alicyclic dicarboxylate esters (for example diisononylcyclohexanedicarboxylate esters), phosphate esters (for example tricresyl phosphate, triphenyl phosphate, diphenyl cresyl phosphate, diphenyl octyl phosphate, tris(2-ethylhexyl) phosphate, tris(2-butoxyethyl) phosphate), citrate esters, lactate esters, epoxy plasticizers, benzenesulfonamides, methylbenzenesulfonamides and the like. Particularly preferred plasticizers are diisononyl cyclohexanedicarboxylate, dibutyl phthalate, diisononyl phthalate and dinonylundecyl phthalate. Further preferred plasticizers are so-called polymeric plasticizers obtained by reacting dihydric alcohols with dibasic carboxylic acids, optionally with co-use of monofunctional alcohols. Dicarboxylic acid components include for example glutaric anhydride, maleic acid, maleic anhydride, fumaric acid, dimeric fatty acids. Preference is given to dicarboxylic acids of general formula HOOC—$(CH_2)_y$—COOH, wherein y is a number from 1 to 20, preferably an even number from 2 to 20, for example succinic acid, adipis acid, sebacic acid and dodecanedicarboxylic acid. Contemplated dihydric alcohols include for example ethylene glycol, propane-1,2-diol, propane-1,3-diol, butane-1,3-diol, butene-1,4-diol, butyne-1,4-diol, pentane-1,5-diol, hexane-1,6-diol, octane-1,8-diol and dodecane-1,12-diol, neopentyl glycol, 2-methylpropane-1,3-diol, methylpentanediols, also diethylene glycol, triethylene glycol, tetraethylene glycol, polyethylene glycol, dipropylene glycol, polypropylene glycol, dibutylene glycol and polybutylene glycols. Employable monofunctional alcohols include linear and branched alcohols having 1-15 carbon atoms, preferably 2-8 carbon atoms, such as ethanol, methanol, 2-ethylhexanol, 2-propylheptanol, butanol, hexanol, octanol, isononanol.

The plasticizer-containing substrates are preferably materials made of polyvinyl chloride (PVC, plasticized PVC). The content of plasticizer in the substrates is for example 10% to 70% by weight, preferably 25% to 50% by weight.

In a preferred embodiment the substrate is a plasticizer-containing PVC film, for example a graphics film made of plasticized PVC which is preferably produced either by calendering or by casting. In a further preferred embodiment the substrate is a plasticizer-containing PVC film for a self-adhesive label made by calendering.

The invention therefore also provides for the use of a hotmelt adhesive according to the invention on a graphics film made of plasticized PVC or on a self-adhesive label made of plasticized PVC.

The invention also provides a self-adhesive graphics film made of plasticized PVC having an adhesive layer formed from the hotmelt adhesive according to the invention.

The invention also provides a self-adhesive label made of plasticized PVC having an adhesive layer formed from the hotmelt adhesive according to the invention.

After application to the carrier the radiation-crosslinkable hotmelt adhesive according to the invention is irradiated with high-energy radiation, preferably UV light, in particular UV-C radiation (200-280 nm), to effect crosslinking. To this end the coated substrates are generally placed on a conveyor belt and the conveyor belt is run past a radiation source, for example a UV lamp. The degree of crosslinking of the polymers depends on the duration and intensity of the irradiation. The total radiation energy is preferably 100 to 1500 mJ/cm² (based on the wavelength range from 250 to 440 nm). Employable UV sources include the customary sources, for example intermediate pressure mercury lamps having a radiative power of 80 to 240 W/cm.

The hotmalt adhesives according to the invention feature good plasticizer resistance only a slight decrease in adhesive strength (cohesion), if any, after application to films made of plasticized PVC and storage at elevated temperatures.

only a slight decrease in adhesion, if any, after application to films made of plasticized PVC and storage at elevated temperatures.

peel strengths (adhesion) after application to films made of plasticized PVC and storage at elevated temperatures of >10 N/25 mm.

shear strength values (adhesive strength) after application to films made of plasticized PVC and storage at elevated temperatures of >15 h.

EXAMPLES

Input materials:
nBA n-butyl acrylate
2-EHA 2-ethylhexyl acrylate
MA methyl acrylate
AA acrylic acid
F1 photoinitiator monomer: polymerizable photoinitiator (35% solution in MEK) of formula F-1.
MEK methyl ethyl ketone
t-BPPiv tert-butyl perpivalate (75% solution in mineral oil)
Palamoll® 632: polyester made of adipic acid and 1,2-propanediol, polymeric adipate dynamic viscosity 2000-3500 mPas
Plastomoll® DOA: di-i-octyl adipate; monomeric adipate; dynamic viscosity 13-15 mPas (mixture of di-n-octyl adipate and diethylhexyl adipate)
Lutonal® M 40: polyvinyl methyl ether
Foral® 85-E: glyceryl ester of hydrogenated colophony resin
acResin® A 260 UV: MA-free polyacrylate, UV-crosslinkable
acResin® A 204 UV: polyacrylate, UV-crosslinkable having MA content of more than 15% and less than 20% by weight
Polymer 1: UV-crosslinkable poly(meth)acrylate made of 44% by weight of 2-EHA, 40% by weight of MA, 5% by weight of AA, 10% by weight of MMA, 1% by weight of F1

Production of polymer 1 (V7)

In a polymerization apparatus consisting of a glass reactor, a reflux condenser, a stirrer and a nitrogen inlet 210 g of MEK are initially charged under a light nitrogen stream and heated to 80° C. 25 g of altogether 920 g of a monomer mixture composed of 2-EHA, MA, AA, MMA and F1 and having the abovementioned composition are added. Upon reattaining 80° C. 1.9 g of a starter solution of 3.6 g of tert-butyl perpivalate and 42.3 g of MEK are added and the mixture is polymerized for 3 min. Then the remaining 895 g of monomer mixture and 44 g of starter solution are added over 3 h. The temperature is then increased to 90° C. and a solution of 3 g of tert-butyl perpivalate in 28 g of MEK is added over 30 min. A vacuum is then applied and the solvent is distilled off at not more than 135° C. and less than 50 mbar. The mixture is then degassed with slow stirring for 1 h at 135° C. and the maximum achievable vacuum. The melt is drained into a PP cup.

K value (1% in THF): 42
Zero-shear viscosity at 130° C.: 51 Pas

Production of the mixtures:

V2: 50 g of acResin® A 260 UV are heated to 80° C. and 3.5 g Palamoll® 632 are added with stirring, then the mixture is cooled.

K value of acResin® A 260 UV (1% in THF): 48-52
Zero-shear viscosity of acResin A 260 UV at 130° C.: 30-70 Pas V4: 50 g of acResin® A 204 UV are heated to 80° C. and 2 g of Palamoll® 632 are added with stirring, then the mixture is cooled.

K value (1% in THF): 49
Zero-shear viscosity at 130° C.: 37 Pas

V5: 50 g of acResin® A 204 UV are heated to 80° C. and 10 g of Lutonal® M40 are added with stirring, then the mixture is cooled.

K value of acResin® A 204 UV (1% in THF): 48-52
Zero-shear viscosity of acResin® A 204 UV at 130° C.: 20-55 Pas V6: The polymer is synthesized as described for polymer 1 (V7) but before application of the vacuum the solution is cooled in MEK and 64.5 g of Palamoll® 632 are added. The mixture is subsequently worked up as for polymer 1.

K value (1% in THF): 42
Zero-shear viscosity at 130° C.: 40 Pas

B1: The polymer is synthesized and worked up as described in V6. In contrast to V6 the coated film is crosslinked through UV curing.

B2: The polymer is synthesized as described for polymer 1 but before application of the vacuum the solution is cooled in MEK and 64.5 g of Palamoll® 632 and 69 g of Foral® 85-E are added. The mixture is subsequently worked up as for polymer 1.

K value (1% in THF): 42
Zero-shear viscosity at 130° C.: 45 Pas

V8: 50 g of polymer 1 (V7) are heated to 80° C. and 3.5 g of Plastomoll® DOA are added with stirring, then the mixture is cooled.

K value (1% in THF): 40
Zero-shear viscosity at 130° C.: 24 Pas

Measurement of Zero-Shear Viscosity:

The zero-shear viscosity is the threshold value of the viscosity function at infinitely low shear rates. It is measured with an Anton Paar MCR 100 rheometer (US 200 evaluation software) in plate/plate geometry. The samples are measured under oscillatory shear at a small shear amplitude of 10%. Temperature 130° C. (or as stated), angular frequency ramp log 100-0.1 1/s, measuing gap 0.5 mm, evaluation according to Carreau-Gahleitner I, piston diameter 25 mm.

Performance Tests:

The measurements are carried out at room temperature (20° C.) unless explicitly stated otherwise.

The pressure-sensitive adhesives were heated to 120° C. and doctor coated from the melt onto siliconized PET film at an application rate of 25 g/m$^2$ or 15 g/m$^2$ (only V7) and irradiated with UVC light or not irradiated (V6). The film is then transferred to a commercially available 100 μm plasticized PVC film (SK-S-P Transparent from Renolit®) as a carrier. The carrier coated with pressure-sensitive adhesive was cut into 25 mm wide test strips. The tests were either continued immediately or the test strips were stored for 3 days at 70° C. and 50% rel. humidity before testing to determine plasticizer resistance.

a) peel strength

To determine peel strength the 25 mm wide test strips were bonded to the test surface made of steel (AFERA steel) and rolled on once with a 1 kg roller. One end of the test strips is then clamped in the upper jaws of a tensile strain tester. The adhesive strip was removed from the test surface at 300 mm/min and an angle of 180°, i.e. the adhesive strip was bent and removed parallel to the steel test sheet and the force required therefor was measured. The measure for peel strength is the force in N/25 mm obtained as the average value from five measurements. The peel strength was determined 24 hours after bonding. The adhesive strength has fully developed after this time.

b) shear strength

To determine shear strength the test strips were bonded to steel sheet (AFERA steel) with a bonded area of 25×25 mm, rolled on once with a 1 kg roller and then loaded with a 1 kg hanging weight. The shear strength (cohesion) was determined under standard climatic conditions (23° C.; 50% relative atmospheric humidity). The measure for shear strength is the time in hours until the weight drops off. An average was formed from five measurements in each case.

TABLE 1

UV-curable hotmelt adhesives

| Example | UV-crosslinkable poly(meth)acrylate | Additive |
|---|---|---|
| V1 | acResin ® A 260 UV | — |
| V2 | acResin ® A 260 UV | 7% by weight Palamoll 632 |
| V3 | acResin ® A 204 UV | — |
| V4 | acResin ® A 204 UV | 4% by weight Palamoll 632 |
| V5 | acResin ® A 204 UV | 20% by weight Lutonal M 40 |
| V6 | polymer 1 | 7% by weight Palamoll 632 |
| V7 | polymer 1 | — |
| B1 | polymer 1 | 7% by weight Palamoll 632 |
| B2 | polymer 1 | 7% by weight Palamoll 632 7.5% by weight Foral 85E |
| V8 | polymer 1 | 7% by weight Plastomoll DOA |

TABLE 2

Test results

| Example | Irradiation, UVC dose | 24 h Peel steel [N/25 mm] Before storage | After 3 d/70° C. | Shear 1 h steel; 25 × 25 mm, 1 kg [h] Before storage | After 3 d/70° C. |
|---|---|---|---|---|---|
| V1 | 20 mJ/cm² | 16 | 10 | 28 | 5 |
| V2 | 20 mJ/cm² | 14 | 10 | 13 | 4 |
| V3 | 20 mJ/cm² | 12 | 6 | >50 | 11 |
| V4 | 20 mJ/cm² | 12 | 6 | 35 | 10 |
| V5 | 10 mJ/cm² | 24 | 9 | 38 | 4 |
| V6 | — | 27 | 24 | 1 | 0.2 |
| V7 | 10 mJ/cm², (15 g/m²) | 23 | 13 | >50 | 23 |
| B1 | 20 mJ/cm² | 20 | 18 | >50 | >50 |
| B2 | 20 mJ/cm² | 25 | 18 | >50 | 38 |
| V8 | 20 mJ/cm² | 15 | 9 | >50 | 31 |

V1 to V8: Comparative tests;
B1 to B2: inventive

The following adhesion values are preferred:

| | |
|---|---|
| 24 h Peel after 3 d/70° C. | less than 50% drop and >10 N/25 mm |
| 1 h Shear after 3 d/70° C. | less than 50% drop and >15 h |

The results show:

| | |
|---|---|
| V1 | cohesion value too low, cohesion drop (shear) > 50% |
| V2 | cohesion value too low, cohesion drop (shear) > 50% |
| V3 | peel value falls to too low a value, cohesion drop (shear) > 50% |
| V4 | peel value falls to too low a value, cohesion drop (shear) > 50% |
| V5 | peel value drop (peel) and cohesion drop (shear) > 50% |
| V6 | no cohesion |
| V7 | cohesion drop (shear) > 50% |
| B1 | inventive |
| B2 | inventive |
| V8 | peel values too low |

The results show that an MA-free polymer (V1 and V2), both with and without the addition of plasticizer, has too little plasticizer resistance as reflected in a more than 50% drop in cohesion values. A polymer having an MA content of less than 20% (V3) shows excessively low peel values after storage. The addition of plasticizer (V4) does not increase the peel values as desired. Furthermore both samples show too pronounced a drop in cohesion after storage (too little plasticizer resistance). The addition of polyvinyl ethers (V5) does not improve plasticizer resistance either. A composition according to the invention but without crosslinking by means of UV curing (V6) results in very low cohesion values even before storage. However, with crosslinking it is possible to achieve a pressure-sensitive adhesive system that meets the required demands on adhesion values and plasticizer resistance both with additional tackifier (B2) and without additional tackifier (B1). The pure, plasticizer-free polymer (V7) only just fails to meet the demands on plasticizer resistance in respect of shear values after storage. Replacing the polymeric plasticizer with a monomeric plasticizer (V8) results in excessively low peel values.

The invention claimed is:

1. A UV-curable hotmelt adhesive, comprising:
    (a) a UV-crosslinkable poly(meth)acrylate formed from
        (i) 25% to 60% by weight of methyl acrylate,
        (ii) 35% to 60% by weight of an alkyl (meth)acrylate comprising 4 to 8 carbon atoms in the alkyl group,
        (iii) 1% to 10% by weight of an ethylenically unsaturated monomer comprising an acid group,
        (iv) 0.2% to 5% by weight of an ethylenically unsaturated copolymerizable photoinitiator monomer and
        (v) 0% to 25% by weight of a further monomer distinct from (i) to (iv) and
    (b) an aliphatic polyester polymer which at 20° C. has a dynamic viscosity of 500 to 20,000 mPa s in an amount of 1% to 20% by weight, wherein the aliphatic polyester polymer is formed from an aliphatic dicarboxylic acid comprising 3 to 10 carbon atoms and an alkanediol comprising 2 to 10 carbon atoms, and
    wherein a plasticized polyvinyl chloride (PVC) film coated with the UV-curable hotmelt adhesive exhibits a 180 degree peel strength of >10 N/25 mm after storage for 3 days at 70° C. and 50% relative humidity;
    and wherein the plasticized polyvinyl chloride (PVC) film coated with the UV-curable hotmelt adhesive exhibits a shear strength value of >15 h after storage for 3 days at 70° C. and 50% relative humidity.

2. The UV-curable hotmelt adhesive of claim 1, wherein before crosslinking the UV-crosslinkable poly(meth)acrylate has a glass transition temperature of not more than 10° C.

3. The UV-curable hotmelt adhesive of claim 1, wherein before crosslinking the UV-crosslinkable poly(meth)acrylate has a K value of at least 20.

4. The UV-curable hotmelt adhesive of claim 1, wherein the aliphatic dicarboxylic acid is an adipic acid and the alkanediol comprises 4 to 8 carbon atoms.

5. The UV-curable hotmelt adhesive of claim 1, wherein the UV-crosslinkable poly(meth)acrylate comprises from 0.5% to 15% by weight of further monomer (v) distinct from (i) to (iv).

6. The UV-curable hotmelt adhesive of claim 1, wherein the further monomer (v) does not contain N-containing monomers and aromatic monomers.

7. The UV-curable hotmelt adhesive of claim 1, wherein
(ii) the alkyl (meth)acrylate comprising 4 to 8 carbon atoms in the alkyl group is at least one selected from the group consisting of n-butyl acrylate, n-hexyl acrylate, 2-ethylhexyl acrylate and the aliphatic dicarboxylic acid comprising 4 to 8 carbon atoms and alkanediol comprising 4 to 8 carbon atoms.

8. The UV-curable hotmelt adhesive of claim 1, further comprising a tackifier.

* * * * *